United States Patent
Nichols

(10) Patent No.: US 11,210,519 B2
(45) Date of Patent: Dec. 28, 2021

(54) PROVIDING AUGMENTED REALITY IMAGES TO AN OPERATOR OF A MACHINE

(71) Applicant: Trimble Inc., Sunnyvale, CA (US)

(72) Inventor: Mark Nichols, Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 16/743,429

(22) Filed: Jan. 15, 2020

(65) Prior Publication Data

US 2021/0216769 A1    Jul. 15, 2021

(51) Int. Cl.
| | |
|---|---|
| *G06K 9/00* | (2006.01) |
| *G06T 7/73* | (2017.01) |
| *G06T 19/00* | (2011.01) |
| *E02F 9/20* | (2006.01) |
| *G02B 27/01* | (2006.01) |
| *G05D 1/02* | (2020.01) |

(52) U.S. Cl.
CPC .......... *G06K 9/00671* (2013.01); *E02F 9/205* (2013.01); *G02B 27/0172* (2013.01); *G02B 27/0179* (2013.01); *G05D 1/027* (2013.01); *G05D 1/0253* (2013.01); *G05D 1/0278* (2013.01); *G06T 7/74* (2017.01); *G06T 19/006* (2013.01); *G02B 2027/0181* (2013.01); *G02B 2027/0183* (2013.01); *G02B 2027/0187* (2013.01); *G06T 2207/30204* (2013.01); *G06T 2207/30244* (2013.01)

(58) Field of Classification Search
CPC ...... G06K 9/00671; G06T 7/74; G06T 19/006
See application file for complete search history.

(56) References Cited

U.S. PATENT DOCUMENTS

| | | |
|---|---|---|
| 9,459,692 B1 | 10/2016 | Li |
| 2003/0210228 A1 | 11/2003 | Ebersole et al. |
| 2011/0043341 A1* | 2/2011 | Kumagami ............... B60R 1/00 340/425.5 |
| 2015/0199847 A1 | 7/2015 | Johnson et al. |
| 2015/0309311 A1* | 10/2015 | Cho ..................... G02B 27/017 345/8 |
| 2017/0178359 A1 | 6/2017 | Spiessl et al. |
| (Continued) | | |

FOREIGN PATENT DOCUMENTS

GB      2 567 012 A     4/2019

OTHER PUBLICATIONS

International Search Report and Written Opinion for Application No. PCT/US2021/012777, dated Apr. 30, 2021, 19 pages.

*Primary Examiner* — Yi Yang
(74) *Attorney, Agent, or Firm* — Kilpatrick Townsend and Stockton LLP

(57) ABSTRACT

Systems and methods described herein provide augmented reality images to an operator of a machine. A pose of an augmented reality device relative to a cab of the machine is determined using image information. A pose of the augmented reality device in a real world coordinate frame is determined using a pose of the machine in the real world coordinate frame and the pose of the augmented reality device relative to the cab of the machine. Digital content is provided on one or more displays of the augmented reality device. The digital content is arranged on the one or more displays based on the pose of the augmented reality device in the real world coordinate frame.

14 Claims, 6 Drawing Sheets

(56) References Cited

U.S. PATENT DOCUMENTS

| | | | |
|---|---|---|---|
| 2018/0188384 A1* | 7/2018 | Ramanandan | G01S 19/53 |
| 2018/0225875 A1* | 8/2018 | Yasrebi | G06F 3/011 |
| 2019/0235242 A1* | 8/2019 | Cummings | G02B 27/0179 |
| 2019/0376997 A1* | 12/2019 | El-Sheimy | G01P 5/04 |
| 2019/0384383 A1 | 12/2019 | Lee | |

* cited by examiner

PROVIDING AUGMENTED REALITY IMAGES TO AN OPERATOR OF A MACHINE

FIELD

Embodiments described herein relate generally to providing augmented reality images to an operator of a machine, and more particularly, to providing digital content (e.g., a digital model) on a display of an augmented reality device based on a pose of the augmented reality device in a real world coordinate frame.

BACKGROUND

Uses of augmented reality and mixed reality devices, such as the Microsoft HoloLens, and development tools such as ARCore and ARToolKit, are increasing in a number of different applications. Augmented reality allows real world objects to be enhanced by computer-generated information. Merely as an example application, augmented reality devices are used in the construction industry where digital models of buildings or other structures can be presented on a display while a user is viewing the exact position where the building or structure will be built (or is being built). The digital model can be georeferenced so that it is presented in the proper location and with the proper size and orientation. The augmented reality device may be in the form of goggles or a heads-up display worn by the user.

Augmented reality devices typically use a number of different sensors to track position and orientation (pose), and they typically use a number of different lenses to project the digital model for viewing by the user. As an example, a head-mounted device such as the HoloLens may include a motion sensor (e.g., an inertial measurement unit (IMU)) along with image sensors (e.g., cameras) to track tilt and rotation of a user's head so that a digital model, or a portion of a digital model, can be correctly displayed depending on where the user is looking.

Tracking the pose of an augmented reality device can be difficult in certain situations. For example, when an augmented reality device is used in a room on a ship, the motions sensors may detect that the device is moving (motion of the ship), while the image sensors may detect that the device is stationary (or moving in a way that is inconsistent with the motion sensors). Another example is when an augmented reality device is used while driving or riding in a vehicle. The motion sensors may detect movement (translational movement of the vehicle), while the image sensors may detect that the device is moving based on the scene outside the windows but not moving based on the scene inside the vehicle. These situations can lead to improper placement and orientation of digital models displayed by the augmented reality device. Thus, improved systems and methods for providing augmented reality images to a user are desired.

SUMMARY

Embodiments described herein provide improved systems and methods for tracking pose of an augmented reality device. The systems and methods are particularly beneficial when the augmented reality device is used within a vehicle where motion sensors and image sensors may sense different motions. The systems and methods improve pose estimation and thus enable more accurate augmented reality images to be provided to a user. As used herein, an augmented reality image is one that is provided on a display of an augmented reality device and includes digital content (e.g., a digital model) that may be overlaid on actual image information obtained by image sensors. The systems and methods improve pose estimation in situations where motion and image sensors may otherwise provide conflicting information.

In accordance with a particular embodiment, for example, a system for providing augmented reality images to an operator of an earth moving machine includes a position and orientation system configured to determine a pose of the earth moving machine in a real world coordinate frame. An augmented reality device is disposed inside a cab of the earth moving machine and configured to provide image information to the operator. The augmented reality device includes one or more processors configured to receive the pose of the earth moving machine in the real world coordinate frame; determine a pose of the augmented reality device relative to the cab of the earth moving machine using the image information; determine a pose of the augmented reality device in the real world coordinate frame using the pose of the earth moving machine in the real world coordinate frame and the pose of the augmented reality device relative to the cab of the earth moving machine; and provide digital content on one or more displays of the augmented reality device. The digital content is arranged on the one or more displays based on the pose of the augmented reality device in the real world coordinate frame.

In an embodiment, the augmented reality device is a head-mounted augmented reality device worn by the operator of the earth moving machine.

In another embodiment, the augmented reality device determines the pose of the augmented reality device relative to the cab of the earth moving machine using visual odometry.

In another embodiment, the augmented reality device determines the pose of the augmented reality device relative to the cab of the earth moving machine using one or more markers captured in the image information. The one or more markers are disposed at known locations in the cab of the earth moving machine.

In another embodiment, the augmented reality device determines the pose of the augmented reality device relative to the cab of the earth moving machine using portions of the image information associated a scene inside the cab and disregarding portions of the image information associated with a scene outside the cab.

In another embodiment, the system includes one or more Global Navigation Satellite System (GNSS) devices coupled to the earth moving machine and configured to provide position information, and one or more IMUs coupled to the earth moving machine and configured to provide acceleration information and rotation information of the earth moving machine. The position and orientation system determines the pose of the earth moving machine using the position information, the acceleration information, and the rotation information.

In another embodiment, the augmented reality device further comprises one or more IMUs configured to provide acceleration and rotation information of the augmented reality device, and the augmented reality device is configured to determine the pose of the augmented reality device relative to the cab of the earth moving machine using only the image information.

In yet another embodiment, the augmented reality device is configured to receive the pose of the earth moving machine from the position and orientation system using wireless communications.

In accordance with another embodiment, a method for providing augmented reality images to an operator of a machine includes receiving, at an augmented reality device, a pose of the machine in a real world coordinate frame; obtaining, using a camera of the augmented reality device, image information from inside a cab of the machine; determining, using one or more processors of the augmented reality device, a pose of the augmented reality device relative to the cab of the machine using the image information; determining, using one or more processors of the augmented reality device, a pose of the augmented reality device in the real world coordinate frame using the pose of the machine in the real world coordinate frame and the pose of the augmented reality device relative to the cab of the machine; and providing digital content on one or more displays of the augmented reality device. The digital content is arranged on the one or more displays based on the pose of the augmented reality device in the real world coordinate frame.

In an embodiment, determining the pose of the augmented reality device relative to the cab of the machine comprises: determining an initial pose of the augmented reality device relative to the cab, capturing the image information while moving the machine, identifying features in the image information that are associated with an inside of the cab and identifying features in the image information that are associated with an environment outside the cab, and determining the pose of the augmented reality device using only the features in the image information that are associated with the inside of the cab.

In another embodiment, the pose of the machine in the real world coordinate frame is received using wireless communications.

In accordance with yet another embodiment, a method for providing augmented reality images to an operator of a machine includes receiving a pose of the machine in a real world coordinate frame, obtaining image information from inside a cab of the machine, determining a pose of an augmented reality device relative to the cab of the machine using the image information, determining a pose of the augmented reality device in the real world coordinate frame using the pose of the machine in the real world coordinate frame and the pose of the augmented reality device relative to the cab of the machine, and providing digital content on one or more displays of the augmented reality device. The digital content is arranged on the one or more displays based on the pose of the augmented reality device in the real world coordinate frame.

Numerous benefits are achieved using embodiments described herein over conventional techniques. Some embodiments, for example, use markers placed at known positions within a cab of a machine to allow an augmented reality device to determine its pose relative to the inside of the cab. Image information associated with a scene outside the cab that is associated with movement of the machine may be ignored. This allows the augmented reality device to determine its pose relative to the inside of the cab without getting confused by other image information. Other embodiments use a pose of a machine in a real world coordinate frame along with a pose of an augmented reality device inside a cab of the machine to determine a pose of the augmented reality device in the real world coordinate frame. This allows more accurate augmented reality images to be provided to a user. Depending on the embodiment, one or more of these features and/or benefits may exist. These and other benefits are described throughout the specification with reference to the appended drawings.

DETAILED DESCRIPTION

Embodiments described herein enable an augmented reality device in a moving machine to accurately determine its pose in a real world coordinate frame. Using the pose, the augmented reality system can provide augmented reality images to an operator of the machine. In accordance with a particular embodiment, for example, the augmented reality device may use its pose relative to an inside of a cab of the earth moving machine, along with a pose of the earth moving machine in the real world coordinate frame, to determine its pose in the real world coordinate frame. The augmented reality device can arrange digital content on a display based on its pose in the real world coordinate frame.

Figure 1:
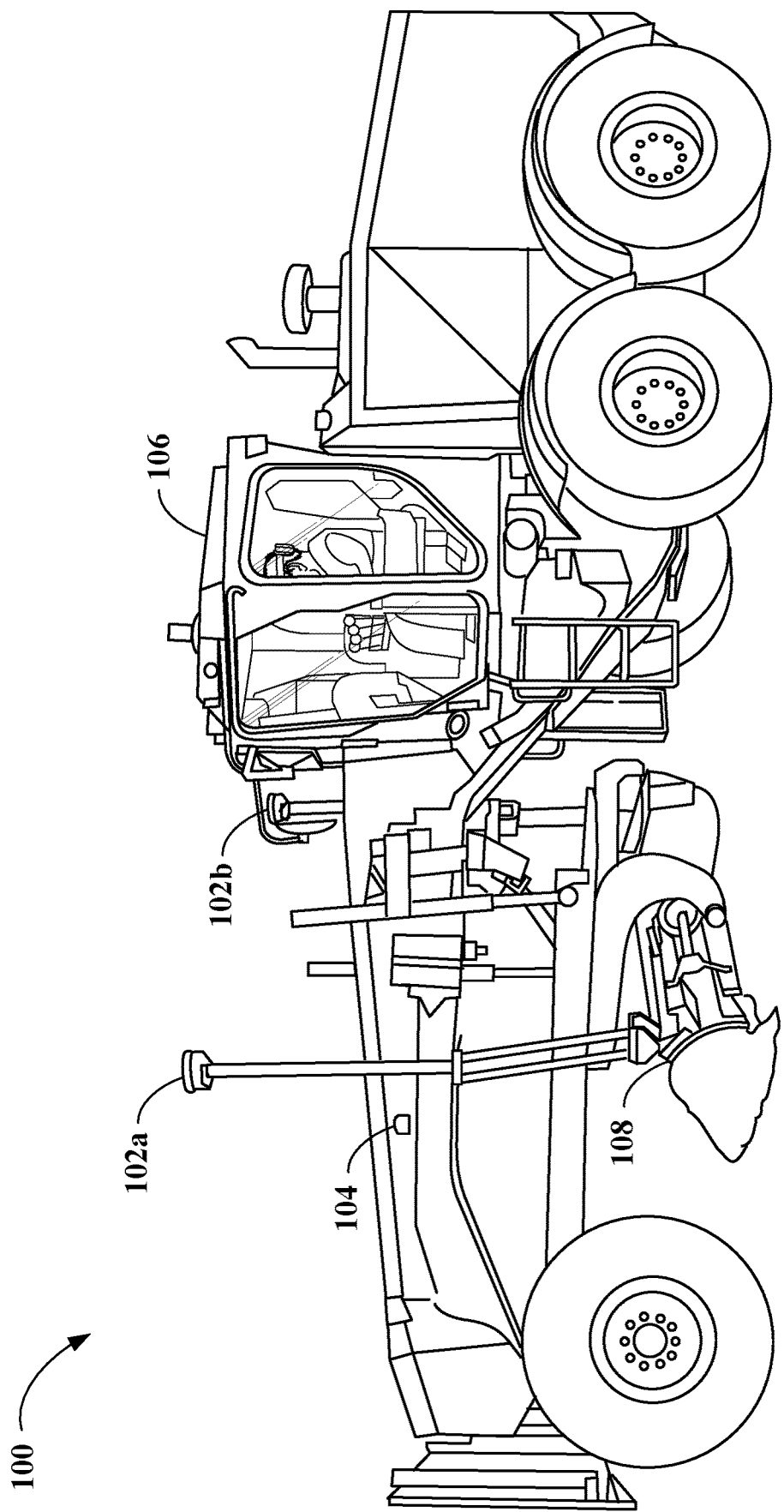
FIG. 1 is a simplified side view of an earth moving machine with sensors for determining pose of the earth moving machine in a real world coordinate frame.

FIG. 1 is a simplified side view of an earth moving machine 100 with sensors for determining pose of the earth moving machine 100 in a real world coordinate frame. The earth moving machine 100 includes a cab 106 with controls for an operator to control the earth moving machine 100. The earth moving machine 100 is used merely as an example of a machine or vehicle that may be used with some embodiments. Embodiments described herein can be used with any type of machine or vehicle that includes a cab for an operator.

In this example, the sensors include position sensors 102a, 102b and a motion sensor 104. The position sensors 102a, 102b are coupled to ends of a blade 108 and are used to determine a position of the blade 108 in the real world coordinate frame. If orientations of linkages between the blade 108 and other parts of the earth moving machine 100 are known, the positions of the other parts in the real world coordinate frame can be determined in accordance with known techniques. For example, a position of the cab 106 can be determined based on the positions of the position sensors 102a, 102b and orientations of the linkages between the blade 108 and the cab 106.

Although not shown in this example, one or more position sensors may also be coupled to a body or cab of the earth moving machine and used to determine the position of the earth moving machine in the real world coordinate frame. In a reverse manner from that described above, the position of the machine may be used to determine the position of the blade 108.

The position sensors 102a, 102b in this example comprise Global Navigation Satellite System (GNSS) devices that include an antenna for receiving GNSS signals and a receiver for processing the signals to determine position information. A portion of the signal processing may be performed by a remote processor in some embodiments. Other types of position sensors for determining the position of the blade 108 and/or for determining the position of the earth moving machine 100 may also be used with embodiments described herein. An example is a target whose position is tracked using a positioning device such as a total station.

The motion sensor 104 in this example is coupled to a frame of the earth moving machine 100. The motion sensor 104 may be configured to provide acceleration and/or rotation information based on movement of the earth moving machine 100. The acceleration information typically includes acceleration in X, Y, and Z axes. The rotation information typically includes pitch and roll and may also include yaw information.

Although only one motion sensor 104 is shown in the example of FIG. 1, the earth moving machine 100 may include a number of other sensors for determining acceleration and rotation information of the earth moving machine 100 and/or of the blade 108. Also, the motion sensor 104 may be disposed on other parts of the earth moving machine 100 and is not limited to the location shown in FIG. 1. As an example, the motion sensor 104 may be disposed on the cab 106 or behind the cab 106. Alternatively, one motion sensor may be disposed on the frame and another motion sensor may be disposed on or behind the cab 106.

The motion sensor 104 may comprises an IMU that includes accelerometers for determining acceleration information and gyros for determining rotation information. The accelerometers may be configurations to determining acceleration along X, Y, and/or Z axes, and the gyros may be configured to determine rotation about each of the same axes. Other types of sensors may be used with the embodiments described herein including sensors that measure only acceleration and sensors that only measure rotation.

The position sensors 102a, 102b and the motion sensor 104 may be communicatively coupled to a position and orientation system via wired or wireless communications. The position and orientation system may be arranged within the cab 106 or remote from the earth moving machine 100 and may include input and output devices (e.g., a display for providing information to the operator). The position and orientation system may be configured to receive position information from the position sensors 102a, 102b and acceleration and rotation information from the motion sensor 104. The position and orientation system may also be configured in accordance with known techniques to determine a pose of the earth moving machine 100 in a real world coordinate frame using the position information, the acceleration information, and the rotation information.

Figure 2:
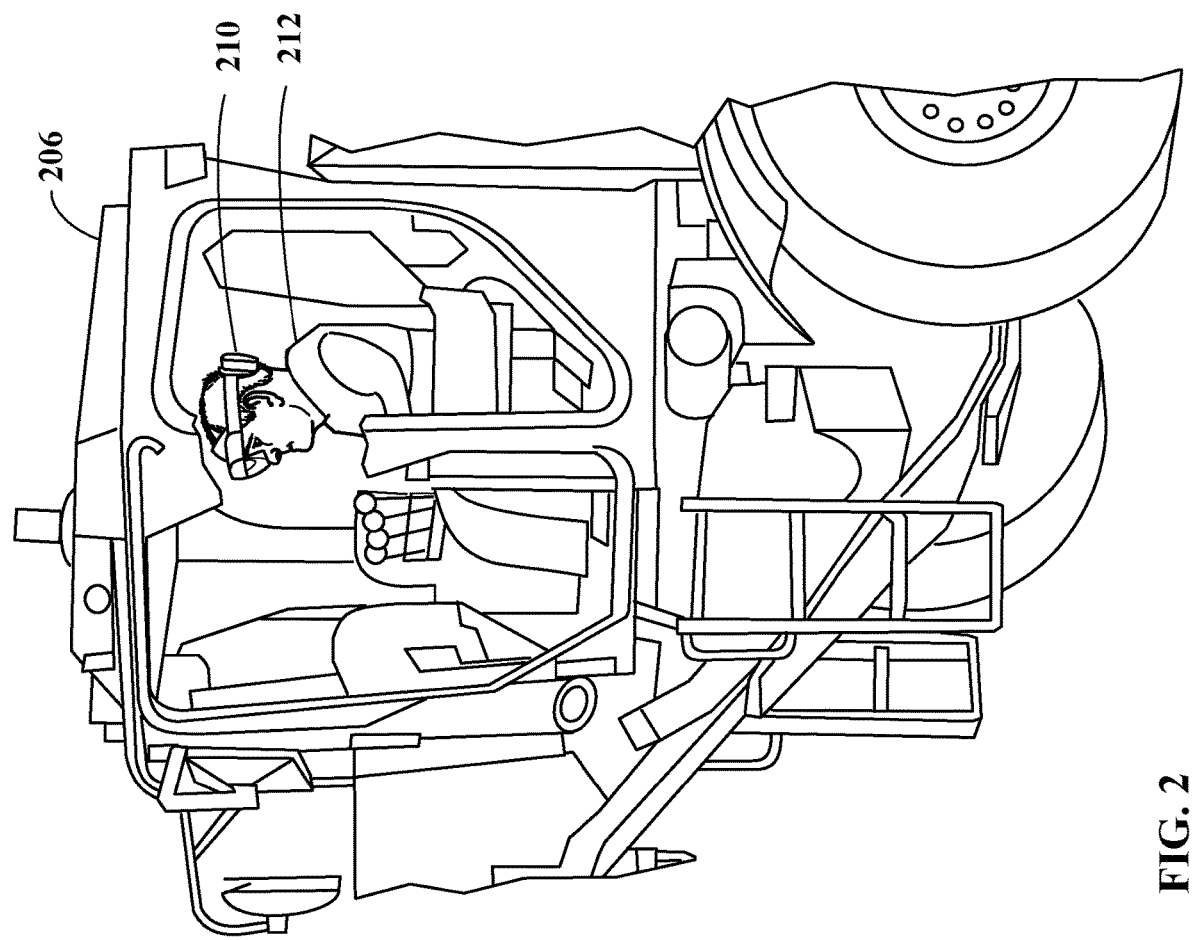
FIG. 2 is a simplified cutaway view of a cab of an earth moving machine, the cutaway showing an operator wearing a head-mounted augmented reality device in accordance with an embodiment.

FIG. 2 is a simplified cutaway view of a cab 206 of an earth moving machine, the cutaway showing an operator 212 wearing a head-mounted augmented reality device 210 in accordance with an embodiment. The operator 212 uses controls in the cab 206 to move the earth moving machine and associated implements such as a blade.

The augmented reality device 210 can be used to display digital content that assists the operator 212 with a particular earth moving job. As an example, the digital content may be a model of how the surrounding terrain will look at completion of the job, or the digital content may be a targeted contour of the terrain. The digital content could also be a model of a building or road. The digital content can be georeferenced in the real world coordinate frame so that it is presented in the proper location and with the proper size and orientation.

For the digital content to be georeferenced in the real world coordinate frame, the augmented reality device 210 must know its pose in the real world coordinate frame. This can be difficult with existing devices because motion sensors and image sensors feeding information to the augmented reality device may mistake changes in pose of the earth moving machine with changes in pose of the augmented reality device and vice versa. This can be caused by conflicting information detected by the motion sensors (e.g., position, acceleration, and/or rotation sensors) and image sensors (e.g., cameras).

Figure 3:
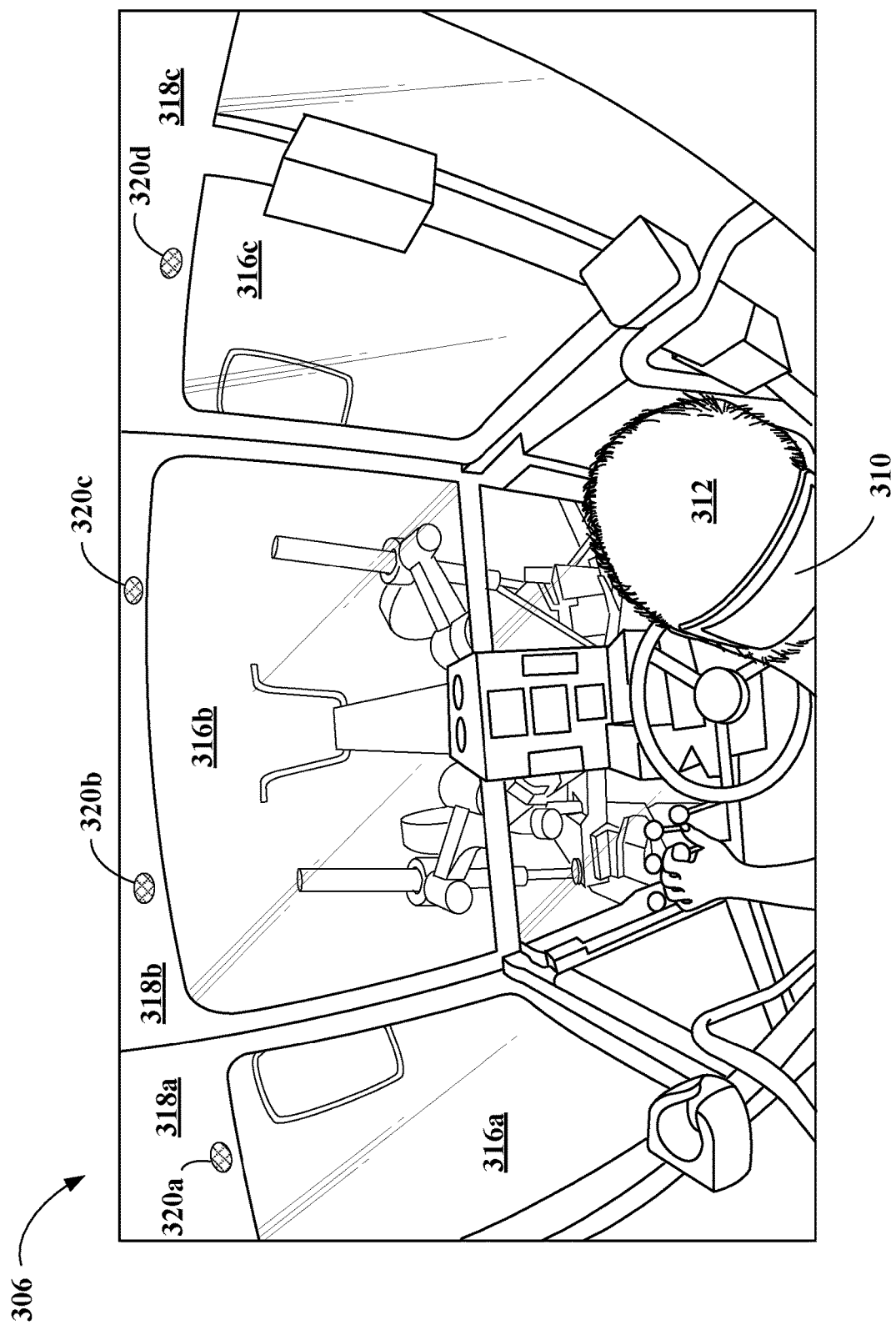
FIG. 3 is a simplified perspective view from inside a cab of an earth moving machine in accordance with an embodiment.

FIG. 3 is a simplified perspective view from inside a cab 306 of an earth moving machine in accordance with an embodiment. This figure shows an operator 312 wearing a head-mounted augmented reality device 310 (only the back of which is visible). Windows 316a, 316b, 316c allow the operator 312 to view a scene outside the cab 306. An inside of the cab 306 includes a steering wheel and other levers to control the earth moving machine and displays for viewing information about the earth moving machine. As the earth moving machine moves, a scene inside the cab 306 may appear to be stationary because the inside of the cab 306 does not move relative to the operator 312 (assuming the operator 312 is stationary), or the scene inside the cab 306 may appear to be moving in a manner that is inconsistent with movement of the earth moving machine (e.g., if the operator 312 is turning his or her head). Portions of the earth moving machine outside the cab 306 may also appear to be stationary because they do not move relative to the operator 312 (e.g., the front of the earth moving machine does not move relative to the inside of the cab 306). As the earth moving machine moves, the operator 312 will move relative to other portions of the scene outside the cab 306 (e.g., the ground and objects in the surrounding environment), and thus at least a portion of a scene outside the cab 306 will be moving (or changing as the earth moving machine moves).

The augmented reality device 310 will typically include motion sensors that can measure acceleration and/or rotation. Using the motion sensors, the augmented reality device 310 can detect the movement of the earth moving machine. The augmented reality device 310 also typically includes image sensors that can detect movement using visual odometry or other methods of tracking movement using image information. Using the image sensors, the augmented reality device 310 can detect movement of the earth moving machine when the image information includes portions of the scene outside the windows 316a, 316b, 316c, and the augmented reality device and may not detect movement of the earth moving machine when the image information includes portions of the scene inside the cab 306 that are not moving relative to the operator 312.

The inside of the cab 306 shown in FIG. 3 includes a front panel 318b that holds the front window 316b and side panels 318a, 318c that hold the side windows 316a, 316c. The front panel 318b and the side panels 318a, 318c do not move relative to the operator 312, unless the operator 312 moves or turns his or her head. In an embodiment, the augmented reality device 310 or a device controller determines a pose of the augmented reality device 310 relative to the cab 306 using the image information obtained by one or more cameras of the augmented reality device 306. As an example, the augmented reality device 310 may use visual odometry to track changes in pose of the augmented reality device 310 using image information from inside the cab 306.

The pose of the augmented reality device 310 may be used with a pose of the earth moving machine to determine a pose of the augmented reality device 310 in a real world coordinate frame.

Portions of the inside of the cab 306 that do not move relative to the operator 312 include the front panel 318b and the side panels 318a, 318c (assuming the operator 312 is stationary). When determining pose, the augmented reality device 310 may disregard image information from the windows 316a, 316b, 316c, since at least a portion of the image information from these areas moves or changes when the earth moving machine moves.

In an embodiment, a model of the inside of the cab 306 may be determined by the augmented reality device 310 using conventional visual recognition techniques. The model may identify the panels 318a, 318b, 318c and the windows 316a, 316b, 316c. Using the model, the augmented reality device 310 may filter out image information obtained from the windows 316a, 316b, 316c and use only the image information from the panels 318a, 318b, 318c and other stationary features when determining a pose of the augmented reality device 310 relative to the inside of the cab 306.

In another embodiment, markers 320a, 320b, 320c, 320d may be placed at known locations within the cab 306. Using positions of the markers 320a, 320b, 320c, 320d, the augmented reality device 310 may determine a pose of the augmented reality device 310 relative to the inside of the cab 306.

As can be appreciated with reference to FIG. 3, the pose of the augmented reality device 310 relative to the inside of the cab 306 will depend on a position of the augmented reality device 310 and an orientation of the augmented reality device 310. As an example, the operator 312 may be leaning forward in his or her seat and looking out the side window 316c. Thus, the position of the augmented reality device 310 will be slightly forward relative to the inside of the cab 306 and the orientation will be facing toward the window 316.

Because the position of the cab 306 in a real world coordinate frame is known from the position sensors on the earth moving machine, the position of the augmented reality device 310 can be determined in the real world coordinate frame using the position of the augmented reality device 310 relative to the cab 306. Similarly, because the orientation of the cab 306 in the real world coordinate frame is known from the motion sensors on the earth moving machine, the orientation of the augmented reality device 310 can be determined in the real world coordinate frame using the orientation of the augmented reality device 310 relative to the cab 306. Using the pose of the augmented reality device 310 in the real world coordinate frame, digital content can be correctly arranged on the one or more displays so that as the operator 312 moves he or she sees the digital content in the proper location and with the proper size and orientation.

Figure 4:
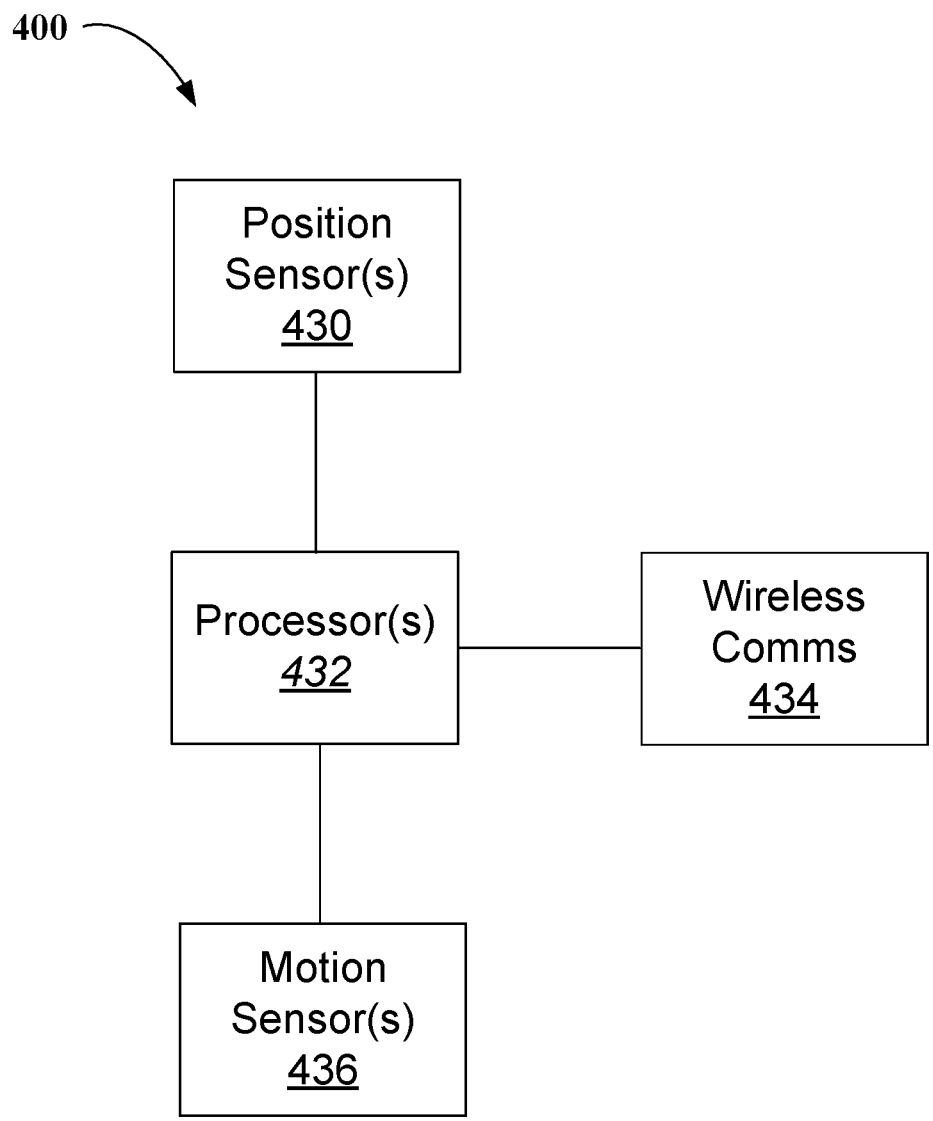
FIG. 4 is a simplified block diagram of an exemplary position and orientation system.

FIG. 4 is a simplified block diagram of an exemplary position and orientation system. The position and orientation system 400 may be configured using conventional techniques to determine a pose (position and orientation) of a machine such as the earth moving machine 100 of FIG. 1. The position and orientation system 400 shown in FIG. 4 is provided merely as an example, and other systems with different configurations that determine pose of a machine may be used with the embodiments described herein.

The position and orientation system 400 includes one or more processors 432 that are communicatively coupled via wired or wireless communications to one or more position sensors 430 and one or more motion sensors 436. The one or more position sensors 430 may comprise conventional GNSS devices and/or other types of position sensors that are configured to determine position information. The one or more motions sensors 436 may comprise IMUS and/or other types of sensors that are configured to provide acceleration information and/or rotation information of the machine or a part of the machine. The one or more position sensors 430 and the one or more motion sensors 436 may be coupled to various parts of the machine as described previously.

The one or more processors 432 may include one or more general-purpose processors and/or one or more special-purpose processors such as digital signal processing chips, graphics acceleration processors, and/or the like. In some embodiments, the one or more processors 432 are configured to determine a pose of the machine using position information from the one or more position sensors 430 and acceleration information and rotation information from the one or more motions sensors 436. The pose can be determined in a real world coordinate frame. The pose of the machine may be determined in response to the one or more processors 432 executing sequences of instructions, that might be incorporated into an operating system and/or other code, which may be contained in memory.

The position and orientation system 400 includes wireless communications 434 capabilities for providing the pose of the machine to other systems and devices.

Figure 5:
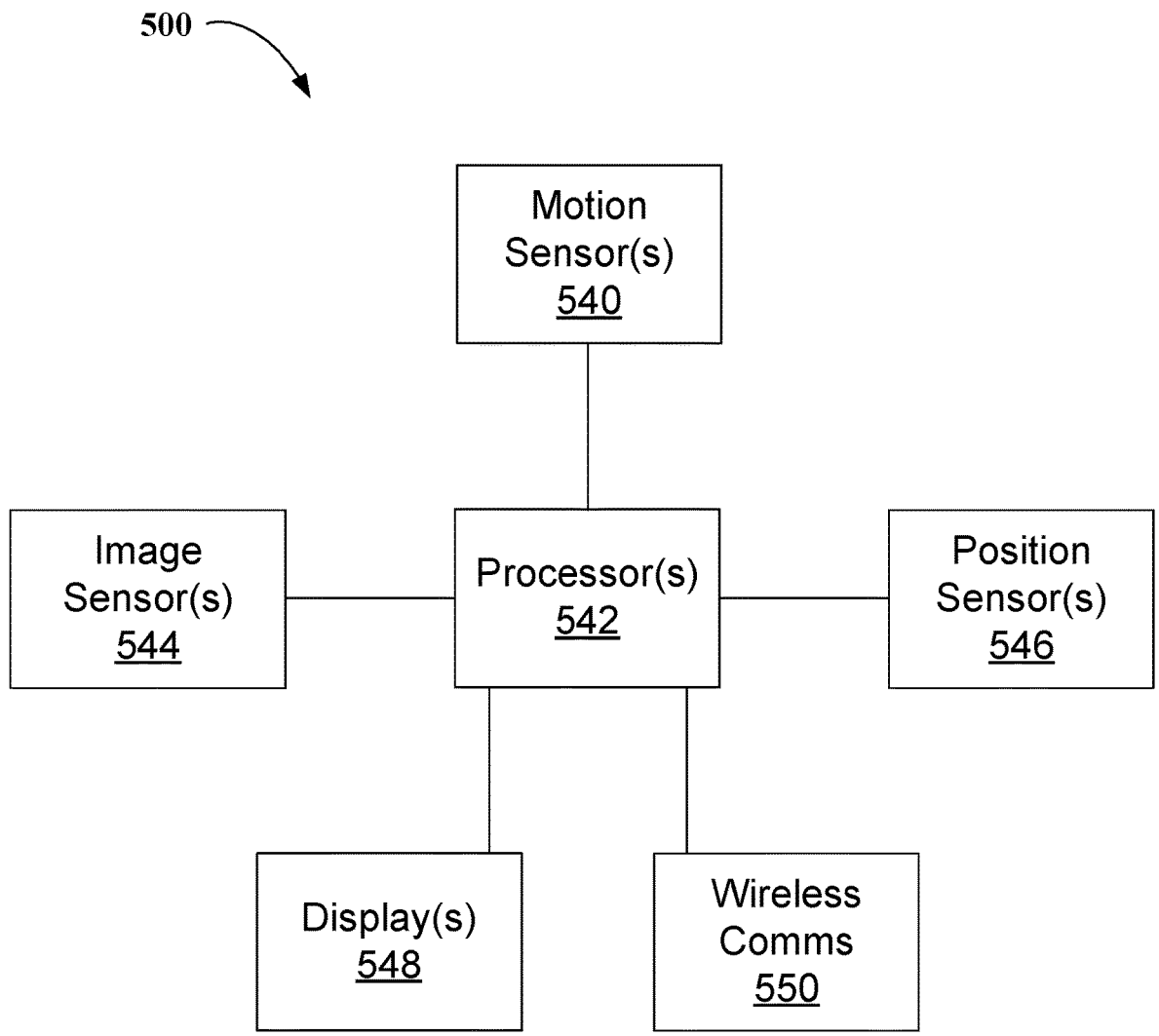
FIG. 5 is a simplified block diagram of an exemplary augmented reality device in accordance with an embodiment.

FIG. 5 is a simplified block diagram of an exemplary augmented reality device 500 in accordance with an embodiment. The augmented reality device 500 is configured to determine a pose of the augmented reality device 500 in a real world coordinate frame. The augmented reality device 500 may be embodied in any form such as goggles or a heat-mounted device. The augmented reality device 500 shown in FIG. 5 is provided merely as an example, and other augmented reality devices with different configurations may be configured as described herein to determine the pose of the augmented reality device in the real world coordinate frame.

The augmented reality device 500 includes one or more processors 542 that are communicatively coupled via wired or wireless communications to one or more motions sensors 540, one or more image sensors 544, and one or more position sensors 546. The one or more motions sensors 540 may comprise IMUs and/or other types of sensors that are configured to provide acceleration information and/or rotation information of the augmented reality device 500. The one or more image sensors 544 may comprise cameras such as video cameras and be configured to provide image information. The one or more position sensors 546 may comprise GNSS devices and/or other types of position sensors that are configured to determine position information of the augmented reality device 500.

The one or more processors 542 may include one or more general-purpose processors and/or one or more special-purpose processors such as digital signal processing chips, graphics acceleration processors, and/or the like. In some embodiments, the one or more processors 542 are configured to determine a pose of the augmented reality device 500 using the acceleration information and/or the rotation information from the one or more motions sensors 540, image information from the one or more image sensors 544, and position information from the one or more position sensors 546. The pose can be determined in a real world coordinate frame. The pose of the machine may be determined in response to the one or more processors 542 executing sequences of instructions, that might be incorporated into an operating system and/or other code, which may be contained in memory.

The augmented reality device 500 also includes one or more displays 548. For some augmented reality devices, such as a head-mounted device, the one or more displays 548 may be miniaturized units that include cathode ray tubes, liquid crystal displays, liquid crystal on silicon displays, organic light-emitting diodes, micro-displays, and/or the like. Digital content is arranged or projected on the displays based on the pose of the augmented reality device in the real world coordinate frame.

The augmented reality device 500 also includes wireless communications 550 capabilities that can be used, as an example, for receiving a pose of a machine from a system such as the position and orientation system 400 shown in FIG. 4.

In an embodiment, the one or more processors 542 of the augmented reality device 500 are configured to:
  Receive a pose of a machine in a real world coordinate frame. The pose may be received using the wireless communications 550.
  Determine a pose of the augmented reality device relative 500 to a cab of the machine. In some embodiments, the pose of the augmented reality device 500 may be determined using only image information from the one or more image sensors 544. The image information may be obtained from inside the cab of the machine.
  Determine a pose of the augmented reality device 500 in the real world coordinate frame using the pose of the earth moving machine in the real world coordinate frame and the pose of the augmented reality device relative to the cab of the earth moving machine.
  Provide digital content on the one or more displays 548 of the augmented reality device 500. The digital content is arranged on the one or more displays 548 based on the pose of the augmented reality device 500 in the real world coordinate frame.

In this example, the pose of the augmented reality device 500 relative to the cab of the machine is determined using image information from the one or more image sensors 548. In some embodiments, the pose may be determined using visual odometry or other visual recognition and/or tracking techniques.

In other embodiments, the pose of the augmented reality device 500 relative to the cab of the machine may be determined using one or more markers captured in the image information. The one or more markers may be disposed at known locations in the cab of the machine allowing the augmented reality device 500 to determine position and orientation relative to the cab.

In other embodiments, the pose of the augmented reality device 500 relative to the cab of the machine may be determined using portions of the image information associated a scene inside the cab and disregarding portions of the image information associated with a scene outside the cab.

In yet other embodiments, determining the pose may include determining an initial pose of the augmented reality device 500 relative to the cab, capturing the image information while moving the machine, identifying features in the image information that are associated with an inside of the cab and identifying features in the image information that are associated with an environment outside the cab, and determining the pose of the augmented reality device using only the features in the image information that are associated with the inside of the cab.

Figure 6:
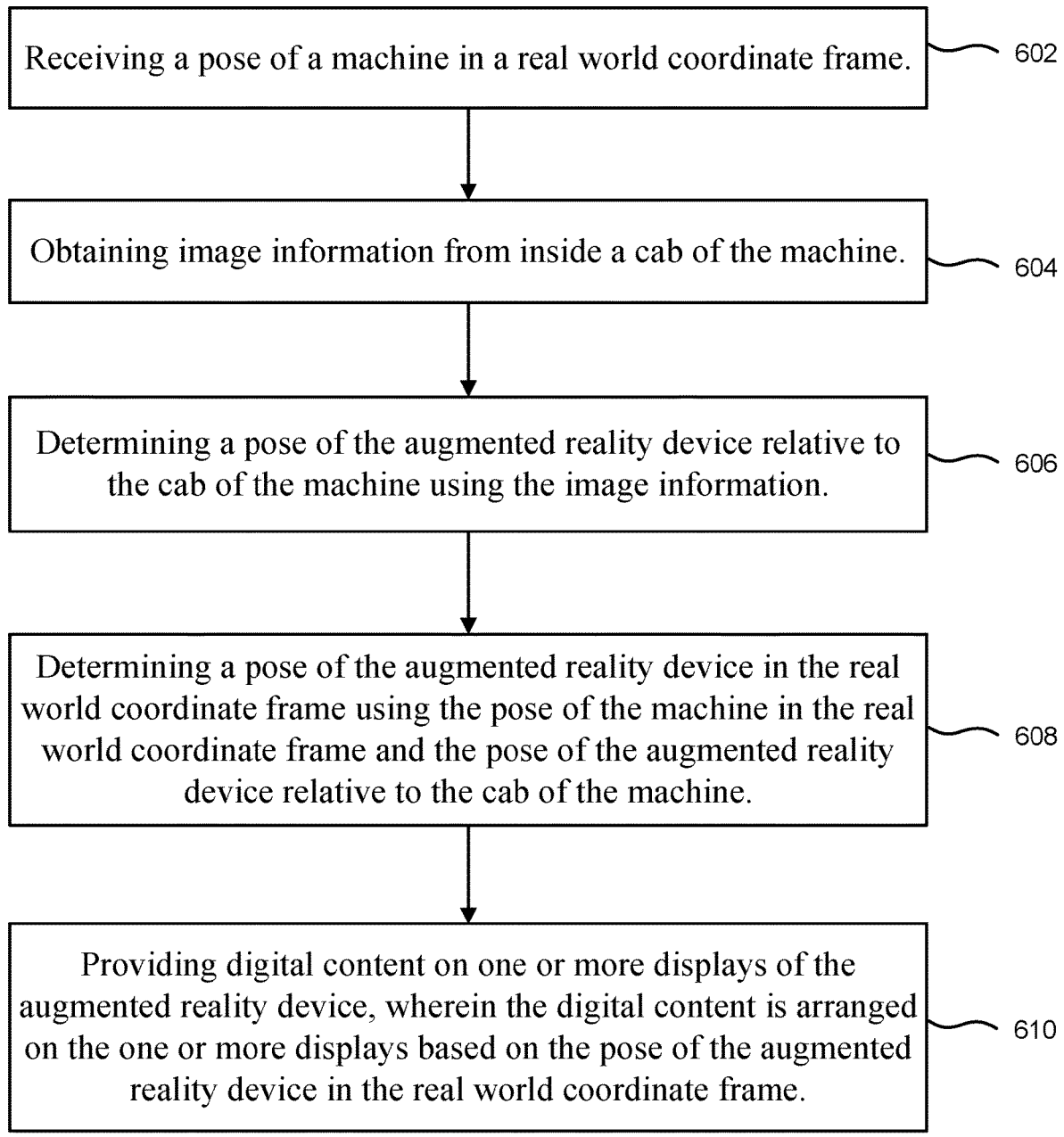
FIG. 6 is a flowchart illustrating an exemplary method for providing augmented reality images to an operator of a machine in accordance with an embodiment.

FIG. 6 is a flowchart illustrating an exemplary method for providing augmented reality images to an operator of a machine in accordance with an embodiment. The method includes receiving a pose of the machine in a real world coordinate frame (602), and obtaining image information from inside the cab of the machine (604). The image information may be obtained using image sensors.

A pose of the augmented reality device is determined relative to the cab of the machine using the image information (606). The pose may be determined using any of the methods described herein.

A pose of the augmented reality device is determined in the real world coordinate frame using the pose of the machine in the real world coordinate frame and the pose of the augmented reality device relative to the cab of the machine (608).

Digital content is provided on one or more displays of the augmented reality device, wherein the digital content is arranged on the one or more displays based on the pose of the augmented reality device in the real world coordinate frame (610).

It should be appreciated that the specific steps illustrated in FIG. 6 provide a particular method for providing augmented reality images to an operator of a machine according to an embodiment. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences. Furthermore, additional steps may be added or removed depending on the particular application.

It should be appreciated that some embodiments may be implemented in whole or in part by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments may be combined with one or more features of other embodiments without departing from the scope of the invention. The specification and drawings are, accordingly, to be regarded in an illustrative rather than a restrictive sense. Thus, the scope of the present invention should be determined with reference to the above description and the appended claims along with their full scope of equivalents.

What is claimed is:
1. A system for providing augmented reality images to an operator of an earth moving machine, comprising:
  a position and orientation system configured to determine a pose of the earth moving machine in a real world coordinate frame;
  an augmented reality device disposed inside a cab of the earth moving machine and configured to provide image information to the operator, the augmented reality device including one or more processors configured to:
receive the pose of the earth moving machine in the real world coordinate frame;
determine, from the image information, a model of the inside of the cab, wherein the model identifies a plurality of panels and a plurality of windows inside the cab;
determine, using visual odometry and the model of the inside of the cab, a pose of the augmented reality device relative to the cab of the earth moving machine using the image information associated with the plurality of panels and filtering out the image information associated with the plurality of windows;
determine a pose of the augmented reality device in the real world coordinate frame using the pose of the earth moving machine in the real world coordinate frame and the pose of the augmented reality device relative to the cab of the earth moving machine; and
provide digital content on one or more displays of the augmented reality device, wherein the digital content is arranged on the one or more displays based on the pose of the augmented reality device in the real world coordinate frame.

2. The system of claim 1 wherein the augmented reality device is a head-mounted augmented reality device worn by the operator of the earth moving machine.

3. The system of claim 1 wherein the augmented reality device determines the pose of the augmented reality device relative to the cab of the earth moving machine using one or more markers captured in the image information, wherein the one or more markers are disposed at known locations in the cab of the earth moving machine.

4. The system of claim 1 further comprising:
one or more Global Navigation Satellite System (GNSS) devices coupled to the earth moving machine and configured to provide position information; and
one or more inertial measurement units (IMUs) coupled to the earth moving machine and configured to provide acceleration information and rotation information of the earth moving machine, wherein the position and orientation system determines the pose of the earth moving machine using the position information, the acceleration information, and the rotation information.

5. The system of claim 1 wherein the augmented reality device further comprises one or more inertial measurement units (IMUs) configured to provide acceleration and rotation information of the augmented reality device, and the augmented reality device is configured to determine the pose of the augmented reality device relative to the cab of the earth moving machine using only the image information.

6. The system of claim 1 wherein the augmented reality device is configured to receive the pose of the earth moving machine from the position and orientation system using wireless communications.

7. A method for providing augmented reality images to an operator of an earth moving machine, the method comprising:
receiving, at an augmented reality device, a pose of the earth moving machine in a real world coordinate frame;
obtaining, using a camera of the augmented reality device, image information from inside a cab of the earth moving machine;
determining, using one or more processors of the augmented reality device, a model of the inside of the cab from the image information, wherein the model identifies a plurality of panels and a plurality of windows inside the cab;
determining, by the one or more processors of the augmented reality device using visual odometry and the model of the inside of the cab, a pose of the augmented reality device relative to the cab of the earth moving machine using the image information associated with the plurality of panels and filtering out the image information associated with the plurality of windows;
determining, using the one or more processors of the augmented reality device, a pose of the augmented reality device in the real world coordinate frame using the pose of the earth moving machine in the real world coordinate frame and the pose of the augmented reality device relative to the cab of the earth moving machine; and
providing digital content on one or more displays of the augmented reality device, wherein the digital content is arranged on the one or more displays based on the pose of the augmented reality device in the real world coordinate frame.

8. The method of claim 7 wherein determining the pose of the augmented reality device relative to the cab of the earth moving machine comprises:
determining an initial pose of the augmented reality device relative to the cab;
capturing the image information while moving the earth moving machine;
identifying features in the image information that are associated with an inside of the cab and identifying features in the image information that are associated with an environment outside the cab; and
determining the pose of the augmented reality device using only the features in the image information that are associated with the inside of the cab.

9. The method of claim 7 wherein the pose of the earth moving machine in the real world coordinate frame is received using wireless communications.

10. The method of claim 7 wherein the pose of the augmented reality device relative to the cab of the earth moving machine is determined using one or more markers captured in the image information, wherein the one or more markers are disposed at known locations in the cab of the machine.

11. A method for providing augmented reality images to an operator of an earth moving machine, the method comprising:
receiving a pose of the earth moving machine in a real world coordinate frame;
obtaining image information from inside a cab of the earth moving machine;
determining, from the image information, a model of the inside of the cab, wherein the model identifies a plurality of panels and a plurality of windows inside the cab;
determining, using visual odometry and the model of the inside of the cab, a pose of an augmented reality device relative to the cab of the earth moving machine using the image information associated with the plurality of panels and filtering out the image information associated with the plurality of windows;
determining a pose of the augmented reality device in the real world coordinate frame using the pose of the machine in the real world coordinate frame and the pose of the augmented reality device relative to the cab of the earth moving machine; and providing digital content on one or more displays of the augmented reality device, wherein the digital content is arranged on the one or more displays based on the pose of the augmented reality device in the real world coordinate frame.

12. The method of claim 11 wherein the pose of the augmented reality device relative to the cab of the earth moving machine is determined using one or more markers captured in the image information, wherein the one or more markers are disposed at known locations in the cab of the machine.

13. A non-transitory computer-readable medium comprising instructions that when executed by a processor cause the augmented reality device to perform the method claim 11.

14. An augmented reality device configured to perform the method of claim 11.

* * * * *